United States Patent [19]
Braginsky et al.

[11] Patent Number: 5,659,956
[45] Date of Patent: Aug. 26, 1997

[54] PROCESS FOR THE PRODUCTION OF HOLLOW BALL BEARINGS

[76] Inventors: Mikhail Braginsky, 1350 Nicollet Ave., Apt. 1701, Minneapolis, Minn. 55403; Leon Dashevsky, 3518 Pilgrim La. N., Plymouth, Minn. 55441

[21] Appl. No.: 599,785

[22] Filed: Feb. 12, 1996

[51] Int. Cl.⁶ .................. B21D 53/10; B23P 11/00
[52] U.S. Cl. .................. 29/898.053; 29/898.069; 29/899.1; 29/463; 228/114.5; 228/2.3; 228/113; 384/49; 384/445; 384/491
[58] Field of Search .............. 29/898.052, 898.053, 29/898.069, 899.1, 463; 228/114.5, 113, 2.3; 384/49, 91, 445, 491

[56] References Cited

U.S. PATENT DOCUMENTS

| | | | |
|---|---|---|---|
| 537,013 | 4/1895 | Burton et al. | 29/899.1 |
| 2,177,928 | 11/1939 | Knudsen | 29/898.069 |
| 3,470,720 | 10/1969 | Eklund et al. | 72/69 |
| 3,485,542 | 12/1969 | Krysaik | 308/188 |
| 3,510,183 | 5/1970 | Liss | 308/188 |
| 3,522,647 | 8/1970 | Holcomb et al. | 29/463 |
| 3,587,154 | 6/1971 | Potter | 29/148.4 |
| 3,599,307 | 8/1971 | Campbell | 29/148.4 A |
| 3,660,880 | 5/1972 | Glenn | 29/148.4 B |
| 3,731,359 | 5/1973 | Glenn | 29/148.4 B |
| 3,735,910 | 5/1973 | Watson et al. | 228/2.3 |
| 3,774,280 | 11/1973 | Eklund et al. | 29/148.4 B |

*Primary Examiner*—Larry I. Schwartz
*Assistant Examiner*—Marc W. Butler
*Attorney, Agent, or Firm*—Norman B. Rainer

[57] ABSTRACT

Hollow ball bearings of improved strength and uniformity are produced by causing identical first and second hemispheric units to rotate at different speeds in facing relationship upon a common axis, and forcing the hemispheres into aligned contact. The frictional heat generated by such contact melts the material adjacent the open rim of each contacting hemisphere. The molten material is distributed by centrifugal force about the interior of the hemispheres. The speeds of the two hemispheres are then equalized with attendant cooling and re-solidification of the molten material, thereby producing a hollow sphere.

6 Claims, 1 Drawing Sheet

PROCESS FOR THE PRODUCTION OF HOLLOW BALL BEARINGS

BACKGROUND OF THE INVENTION

1. Field of the Invention

This invention relates generally to the fabrication of hollow metal balls for use in rolling contact bearings and other applications.

2. Description of the Prior Art

In various industrial applications where extensive use is made of ball bearings and where total equipment weight is a significant factor, the use of hollow ball bearings has been found highly beneficial. For example, in modern military and passenger aircraft, the use of hollow ball bearings in engine construction can yield weight reductions of several hundred pounds.

During high speed operation, substantial inertial forces are exerted upon the bearing races which rotatively secure the ball bearings. The bearing races effectuate smooth movement of the bearing balls in the race during rotational movement with respect to a shaft or journal. The greater weight of solid balls in comparison to hollow balls increases the inertia and centrifugal force of the bearing system, thereby diminishing its anti-frictional mission.

Methods for manufacturing hollow ball bearings generally involve the joinder of a pair of half-shell elements in the form of hemispheres, said joinder being achieved by a butt-joint arrangement utilizing a welding or diffusion bonding technique. With such bonding methods, however, an excessive amount of material generally called a "flash" or "bead" is deposited both inside and outside of the joint area. While the excess of flash material on the outside surface of the joint may be rather easily removed, that formed on the inside surface thereof, of course, remains. The internal flash produces stress of the metallic microstructure, promotes a nonuniform stiffening, and creates unbalanced and consequent unstable conditions in the bearing during its operation. In addition, such welded, or diffusion-bonded joints have proven to be relatively weak, and, therefore, comparatively unreliable. The processes for achieving joinder by the aforesaid techniques are complicated in that they require precise alignment not only of the two hemispheres, but also of the bonding material and/or its means of application.

It is accordingly an object of the present invention to provide a process for the production of hollow ball bearings of improved balance and uniformity.

It is another object of this invention to provide a process as in the foregoing object which is more easily amenable to precision operation.

It is a further object of the present invention to provide a process of the aforesaid nature which affords reduced manufacturing costs.

These objects and other objects and advantages of the invention will be apparent from the following description.

SUMMARY OF THE INVENTION

The above and other beneficial objects and advantages are accomplished in accordance with the present invention by a method for producing ball bearings comprising:

a) selecting first and second identical metallic hemispheric units, each bounded by concave interior and convex exterior surfaces defining a hemispheric center, and a flat circular rim defining an open forward extremity whose center is located slightly forwardly of said hemispheric center, b) securing each hemispheric unit in spaced apart concavely facing relationship upon a common axis which includes said centers, the manner of securement being such as to be supportive of the convex surface and rotative about said axis at adjustable speed, c) causing the first hemispheric unit to rotate upon said axis at a greater speed than the rotational speed of said second unit, d) bringing said units together with an axially applied abutment force in a manner causing contact of said rims and generation of sufficient frictional heat to cause melting of the metal of the rims of both units, the speed of rotation being sufficient to produce distribution of said molten metal about said rims by centrifugal force, e) maintaining said abutment force until the hemispheric centers of the two units meet, and f) causing the rotational speed and direction of said second unit to match the rotational speed and direction of said first unit, and maintaining such matched speeds until the molten metal cools to solidification.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
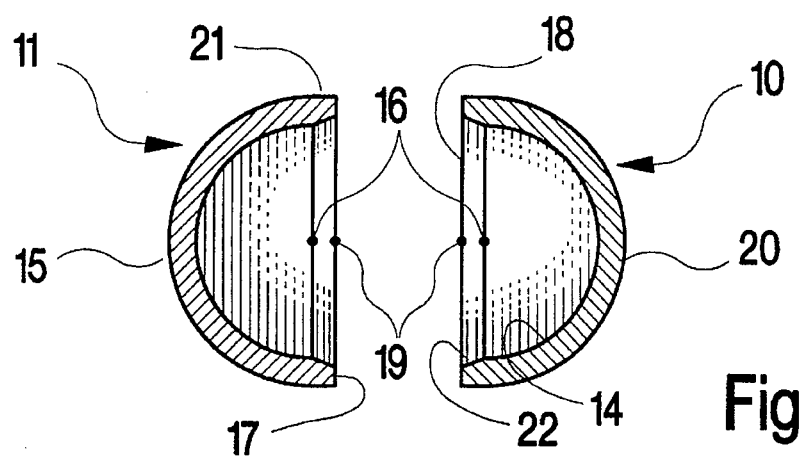
FIG. 1 is a sectional view of a pair of identical metal hemispheric units utilized in the method of the present invention.
Figure 2:
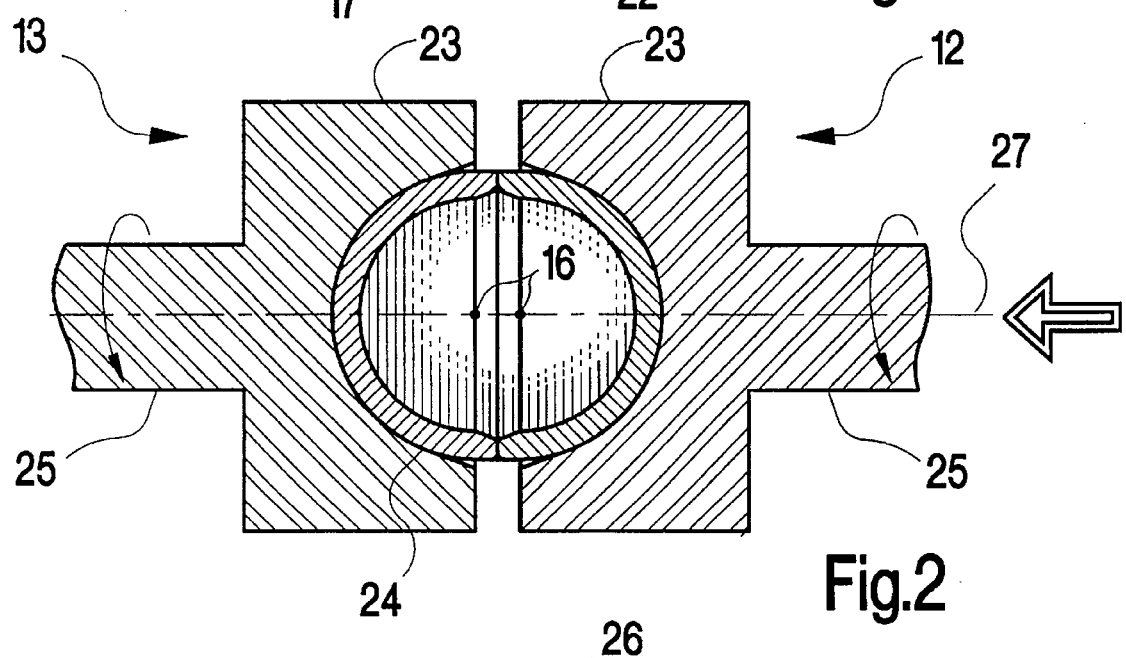
FIG. 2 is a partial sectional view illustrating an initial stage of the method of this invention.
Figure 3:
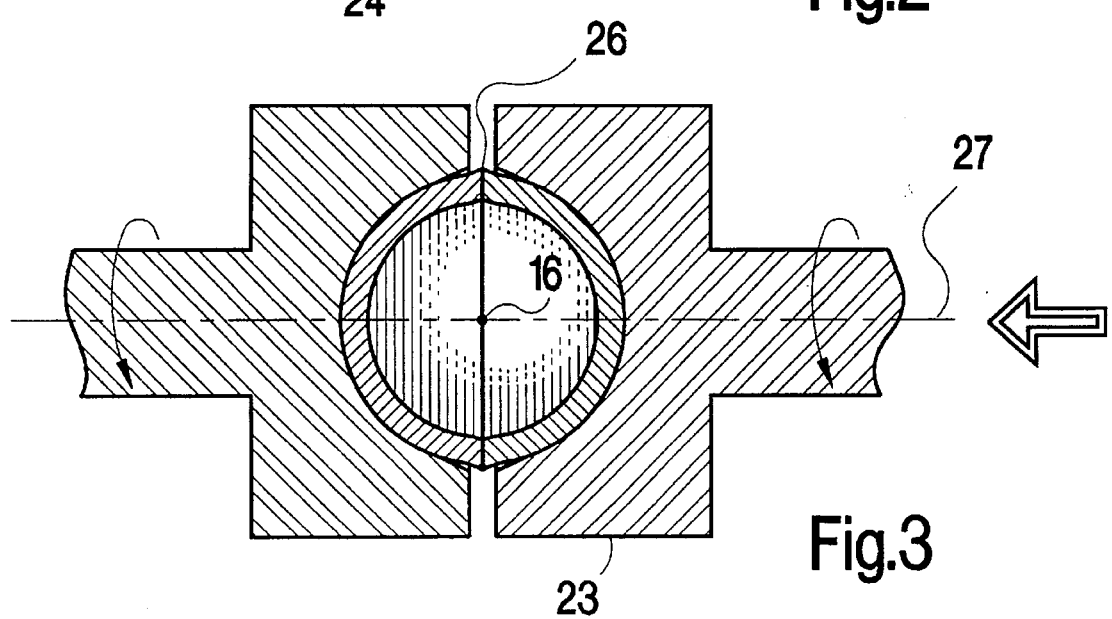
FIG. 3 is a partial sectional view illustrating the final stage of the method of this invention.

Referring to FIGS. 1–3, an embodiment of the process of the present invention is exemplified employing identical first and second hemispheric units 10 and 11, secured by holders 12 and 13, respectively.

The hemispheric units are preferably fabricated of metals such as stainless steels, and other alloys or iron, aluminum and copper, said units having been formed generally by a stamping operation.

Each hemispheric unit is bounded by concave interior and convex exterior surfaces 14 and 15, respectively, having contours that define a hemispheric center 16. The minimum spacing between said concave and convex surfaces defines a wall 20 having a uniform thickness that may, for example, range between 0.5 and 1.0 millimeters. Said wall thickness is preferably at least 8% of the external diameter of the sphere. The minimum radius of said surfaces with respect to center 16 may, for example, range between 0.6 and 1.0 millimeters. The maximum radius may be considerably larger.

A flat circular rim 17 defines an open forward extremity 18 having a center point 19 which is located slightly forwardly of hemispheric center 16. The portion of the unit rearwardly adjacent rim 17 may be characterized as an annular ream 21. The width of ream 21, measured as the distance between center point 19 and center 16, may range between 0.5 and 1.5% of the radius of concave surface 14. The interior surface 22 of said ream may be outwardly chamfered with respect to extremity 18.

In the initial step of the process of this invention, two identical hemispheric units are seated within facing securing blocks 23 mounted upon spindles 25 of said holders. Said securing blocks are positioned so as to be rotatable upon a common axis 27 that includes the hemispheric centers 16. Securement of the units within the concave depressions 24 of blocks 23 may be achieved by a vacuum air stream applied through the respective spindles. Other securement means include frictional, magnetic, adhesive and other holding techniques. At least one of said securing blocks can be moved in a reciprocating manner along said axis to produce aligned contact of the rims of both hemispheres.

In a second step of the process, first unit 10 is caused to be rotated at a much greater speed than second unit 11, which may in fact be motionless, especially in instances where balls of poorer uniformity are acceptable. In a third step, the units are brought together with an axially directed abutment force, indicated by the arrowed lines in FIGS. 1 and 2, said force causing contact of said rims. Such contact of said rims is maintained for a period of time to permit sufficient generation of frictional heat to cause melting of the metal of the annular reams of both units.

The duration of friction-producing contact time may range between 2 and 10 seconds, and is dependent upon the magnitude of the abutment force, the differential speeds of the two units, and the heat capacity and melting point of the particular metal of which the units are fabricated. The abutment force may range from 40 to 90 Newtons/square mm. In order to shorten the contact time, the units and securing blocks 23 may be pre-heated to a temperature close to said melting point. During the contact period, one unit is advanced toward the other until the hemispheric centers 16 coincide.

The speed of rotation of both units is sufficient to distribute the molten metal about said rims by centrifugal force. Such metal distribution results in a ball-bearing having symmetrically balanced interior and exterior configurations. Suitable rotational velocity may range from 1000 to 3000 mm/sec. measured at said rims.

In a fourth step of the process, the speeds of both units, rotating in the same direction and now united as a ball bearing, are adjusted so as to become equal, and such equal speed is maintained until the molten metal cools to solidification. In the final step of the process, holders 12 and 13 are separated, and the formed ball bearing is removed. In a subsequent finishing operation, any exterior bead of metal 26 formed during the fusion of the hemispheric units is removed by conventional machining such as a grinding and polishing treatment.

The method of the present invention produces hollow metal balls which are homogenous insofar as there is no intervening bonding agent present as a separate solid phase producing interfaces between the hemispheres. Accordingly, in comparison with prior art balls made with welding agents, the balls made by the method of this invention are more resistant to the effects of impact, crushing, thermal cycling and abrasive degradation.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described our invention, what is claimed is:

1. A method for producing ball bearings comprising:
   a) selecting first and second identical metallic hemispheric units, each hemispheric unit bounded by concave interior and convex exterior surfaces defining a hemispheric center, and a flat circular rim defining an open forward extremity whose center is located slightly forwardly of said hemispheric center,
   b) securing each hemispheric unit in spaced apart concavely facing relationship upon a common axis which includes said hemispheric centers and rim centers, the manner of securement being such as to be supportive of the convex surface and rotative about said axis at adjustable speed,
   c) causing the first hemispheric unit to rotate upon said axis at a greater rotational speed than the rotational speed of said second hemispheric unit, both hemispheric units being rotated in the same direction,
   d) bringing said hemispheric units together with an axially applied abutment force in a manner causing contact of said rims with consequent generation of sufficient frictional heat to cause melting of the metal of the rims of both hemispheric units, the speed of rotation of both hemispheric units being sufficient to produce distribution of said molten metal circumferentially about said hemispheric centers by centrifugal force,
   e) maintaining said abutment force until the hemispheric centers of the two hemispheric units meet to form a sphere whose center coincides with said hemispheric centers, and
   f) causing the rotational speed of said second hemispheric unit to match the rotational speed of said first hemispheric unit, and maintaining such matched speeds until the molten metal cools to solidification.

2. The method of claim 1 wherein said hemispheric units are held by securement means selected from the group consisting of vacuum, magnetic, frictional and adhesive entities.

3. The method of claim 1 wherein at least one of said hemispheric units is moveable in a reciprocating manner along said axis to produce aligned contact of the rims of both hemispheric units.

4. The method of claim 2 wherein said securement means comprises a block having a concave depression configured to accommodate the convex exterior surface of a hemispheric unit.

5. The method of claim 4 wherein said blocks are maintained at a temperature close to the melting point of said hemispheric units.

6. The method of claim 1 wherein the rotational speed of said first hemispheric unit is between 1000 and 3000 mm/second.

\* \* \* \* \*